US009412491B2

(12) United States Patent
Inao et al.

(10) Patent No.: US 9,412,491 B2
(45) Date of Patent: Aug. 9, 2016

(54) WIRE HARNESS

(71) Applicant: Yazaki Corporation, Tokyo (JP)

(72) Inventors: Shinichi Inao, Makinohara (JP);
Hideomi Adachi, Makinohara (JP);
Takeshi Ogue, Makinohara (JP);
Tatsuya Oga, Makinohara (JP);
Masaaki Suguro, Makinohara (JP);
Yoshiaki Ozaki, Makinohara (JP);
Hiroyuki Yoshida, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/635,063

(22) Filed: Mar. 2, 2015

(65) Prior Publication Data

US 2015/0179300 A1 Jun. 25, 2015

Related U.S. Application Data

(63) Continuation of application No. PCT/JP2013/073441, filed on Aug. 30, 2013.

(30) Foreign Application Priority Data

Sep. 3, 2012 (JP) .................................. 2012-192779

(51) Int. Cl.
*H01B 7/00* (2006.01)
*H02G 3/04* (2006.01)
(Continued)

(52) U.S. Cl.
CPC .......... *H01B 7/0045* (2013.01); *B60R 16/0215* (2013.01); *H01B 7/17* (2013.01); *H02G 3/0481* (2013.01); *H02G 3/0487* (2013.01)

(58) Field of Classification Search
USPC ....................................................... 174/72 A
See application file for complete search history.

(56) References Cited

U.S. PATENT DOCUMENTS 6,051,789 A  4/2000 Kato
7,172,042 B2 *  2/2007 Yamaguchi ............. B60K 6/48
                                              180/65.1
(Continued)

FOREIGN PATENT DOCUMENTS

CN   1193836 A   9/1998
EP   2338741 A2  6/2011
(Continued)

OTHER PUBLICATIONS

Search Report dated Oct. 15, 2013 issued by the International Searching Authority in counterpart International Patent Application No. PCT/JP2013/073441.

(Continued)

*Primary Examiner* — Dhirubhai R Patel
(74) *Attorney, Agent, or Firm* — Sughrue Mion, PLLC (57) ABSTRACT

A wire harness includes at least one conducting path, and a tubular exterior member that covers the conducting path. The exterior member has a shape changed portion in at least one position. The shape changed portion includes at least one small tube portion which includes an accommodation space necessary for accommodating the conducting path, a tube continuous portion one end of which is continuous with an end of the small tube portion, and a large tube portion which is continuous with another end of the tube continuous portion and includes a tubular shape that is larger in outer shape than the small tube portion.

7 Claims, 8 Drawing Sheets

(51) Int. Cl.
*B60R 16/02* (2006.01)
*H01B 7/17* (2006.01)

(56) References Cited

U.S. PATENT DOCUMENTS

| | | | |
|---|---|---|---|
| 7,696,435 B1* | 4/2010 | Thomas | H02G 3/0481 138/118 |
| 2005/0011687 A1 | 1/2005 | Yamaguchi et al. | |
| 2011/0068622 A1 | 3/2011 | Ikeno et al. | |
| 2011/0155458 A1 | 6/2011 | Kato et al. | |
| 2013/0140054 A1 | 6/2013 | Kato et al. | |
| 2013/0241282 A1 | 9/2013 | Ikeno et al. | |

FOREIGN PATENT DOCUMENTS

| | | | |
|---|---|---|---|
| JP | 2004-224156 A | 8/2004 |
| JP | 2012-45962 A | 3/2012 |
| WO | 2012/114476 A1 | 8/2012 |

OTHER PUBLICATIONS

Communication issued on Oct. 15, 2013 by the International Searching Authority in related application No. PCT/JP2013/073441.
Communication from the European Patent Office issued Mar. 24, 2016 in a counterpart European Application No. 13834025.2.
Communication issued Mar. 8, 2016, issued by the Japanese Patent Office in counterpart Japanese Patent Application No. 2012-192779.
Communication from the State Intellectual Property Office of the People's Republic of China issued Jun. 2, 2016 in Chinese Application No. 201380045825.9.

* cited by examiner

WIRE HARNESS

CROSS REFERENCE TO RELATED APPLICATION

This application is a continuation of PCT application No. PCT/JP2013/073441, which was filed on Aug. 30, 2013 based on Japanese Patent Application (No. 2012-192779) filed on Sep. 3, 2012, the contents of which are incorporated herein by reference. Also, all the references cited herein are incorporated as a whole.

BACKGROUND

1. Technical Field

The present invention relates to a wire harness including at least one conducting path and a tubular exterior member covering the conducting path.

2. Background Art

Generally, the battery and the inverter unit of a hybrid car and an electric car are electrically connected by a high voltage (that is, high electric voltage) wire harness. The wire harness disclosed in JP-A-2004-224156 shown below includes a high voltage electric wire serving as a high voltage conducting path and an exterior member accommodating the high voltage electric wire.

The above-described conventional art has several problems related to heat as follows: When the occupancy of the conducting path in the exterior member is low, the part of the conducting path that is in contact with the inner surface of the exterior member is small. At the part where the conducting path and the inner surface of the exterior member are not in contact with each other, the distance of the conducting path from the inner surface of the exterior member is large, so that heat generated at the conducting path cannot be effectively transmitted to the exterior member. From these, with the conventional art, heat dissipation effect cannot be sufficiently obtained.

Moreover, there are cases where part of a wire harness in the direction of the length is cabled in the neighborhood of a heat generation source such as an exhaust pipe, an exhaust manifold, an engine or a motor. In these cases, since the exterior member covering the part is directly exposed to the heat from the heat generation source, there is a possibility that the conducting path accommodated in the exterior path is affected.

The present invention is made in view of the above-described circumstances, and an object thereof is to provide a wire harness capable of enhancing heat dissipation effect and capable of reducing the susceptibility to heat from the outside.

SUMMARY

To solve the above-mentioned problem, the wire harness according to the present invention has the following features (1) to (4):

(1) A wire harness including at least one conducting path and a tubular exterior member covering the conducting path,
wherein the exterior member has a shape changed portion in at least one position; and
wherein the shape changed portion includes at least one small tube portion including an accommodation space necessary for accommodating the conducting path, a tube continuous portion one end of which is continuous with an end of the small tube portion, and a large tube portion being continuous with another end of the tube continuous portion and including a tubular shape that is larger in outer shape than the small tube portion.

(2) The wire harness according to the above (1), wherein in the shape changed portion, an outer periphery length of the small tube portion is shorter than an outer periphery length of the large tube portion.

(3) The wire harness according to the above (1) or (2), wherein the exterior member is made of a resin.

(4) The wire harness according to the above (1) or (2), wherein the exterior member is made of a metal.

The wire harness of the above (1) has the shape changed portion at least on a part of the exterior member, and the shape changed portion includes the small tube portion, the tube continuous portion and the large tube portion. For this reason, the occupancy of the conducting path can be increased in the small tube portion. As a consequence, heat generated at the conducting path is efficiently absorbed at the small tube portion, so that the absorbed heat can be dissipated from the small tube portion. Consequently, the heat dissipation effect can be enhanced compared with the conventional one.

Moreover, according to the wire harness of the above (1), since the exterior member has the shape changed portion including the small tube portion, the tube continuous portion and the large tube portion, the distance between the exterior member and the heat generation source can be secured by disposing the small tube portion of the shape changed portion in accordance with the heat generation source, so that the susceptibility to heat from the outside can be reduced.

According to the wire harness of the above (2), in addition to the advantage of the above (1), the following advantage is produced: By reducing the outer periphery length of the small tube portion, the surface area of the small tube portion can be made smaller than that of the large tube portion, and the surface area can be made small compared with when extrusion is performed. Consequently, since the heat generation source is handled at the small tube portion having such a small surface area, the susceptibility to heat from the outside can be reduced.

According to the wire harness of the above (3), in addition to the advantage of the above (1) or (2), the following advantage is produced: The wire harness can be formed of an exterior member making use of the characteristics of the resin.

According to the wire harness of the above (4), in addition to the advantage of the above (1) or (2), the following advantage is produced: The wire harness can be formed of an exterior member making use of the characteristics of the metal.

DETAILED DESCRIPTION OF THE EXEMPLARY EMBODIMENTS

Wire harnesses according to embodiments include an exterior member having a part where the length of the outer periphery is large and a part where it is small or an exterior member having a large-diameter part and a small-diameter part and at least one conducting path accommodated in such an exterior member.

First Embodiment

Figure 1:
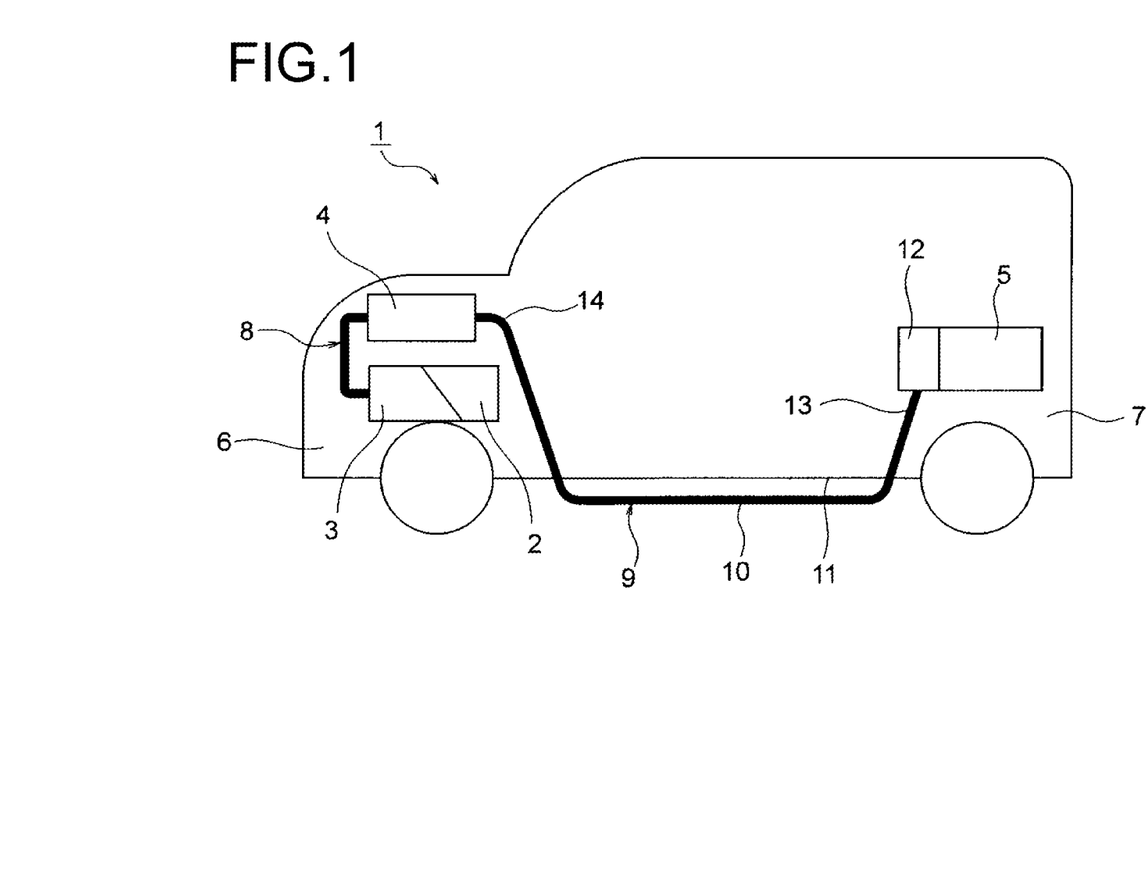
FIG. 1 is a schematic view showing a cabling condition of a wire harness according to a first embodiment.
Figure 2:
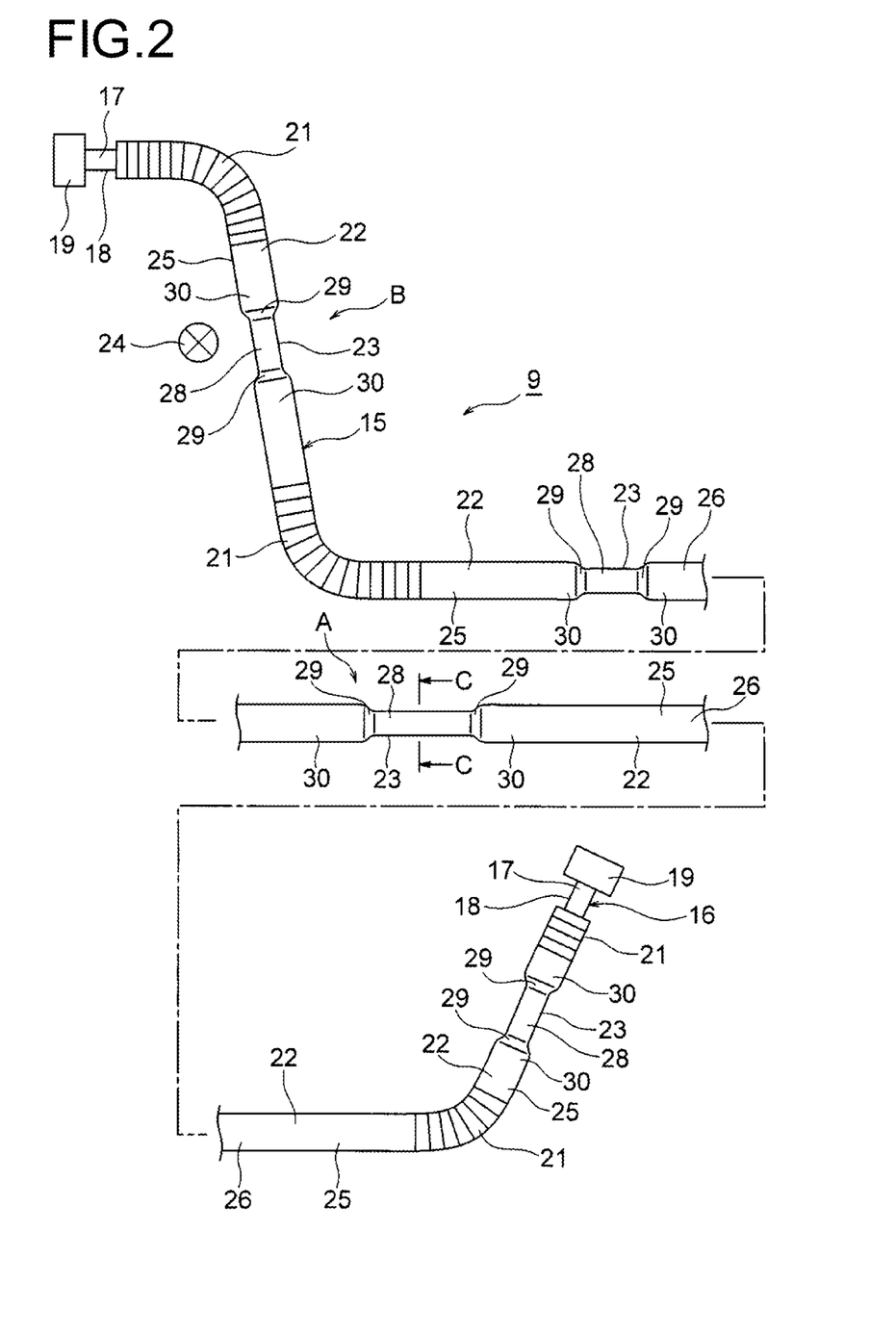
FIG. 2 is a structural view of the wire harness of FIG. 1.
Figure 3:
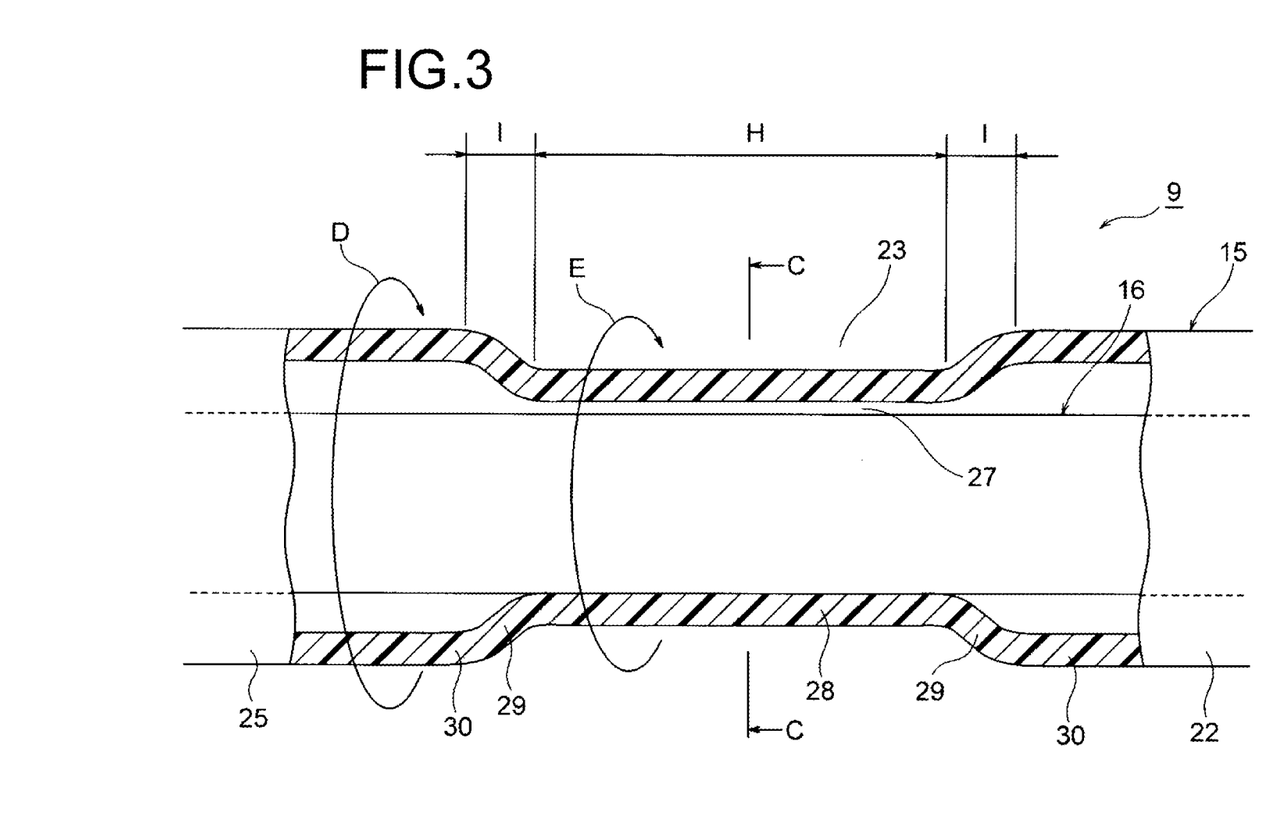
FIG. 3 is a longitudinal cross-sectional view of the part of the arrow A of FIG. 2.
Figure 4:
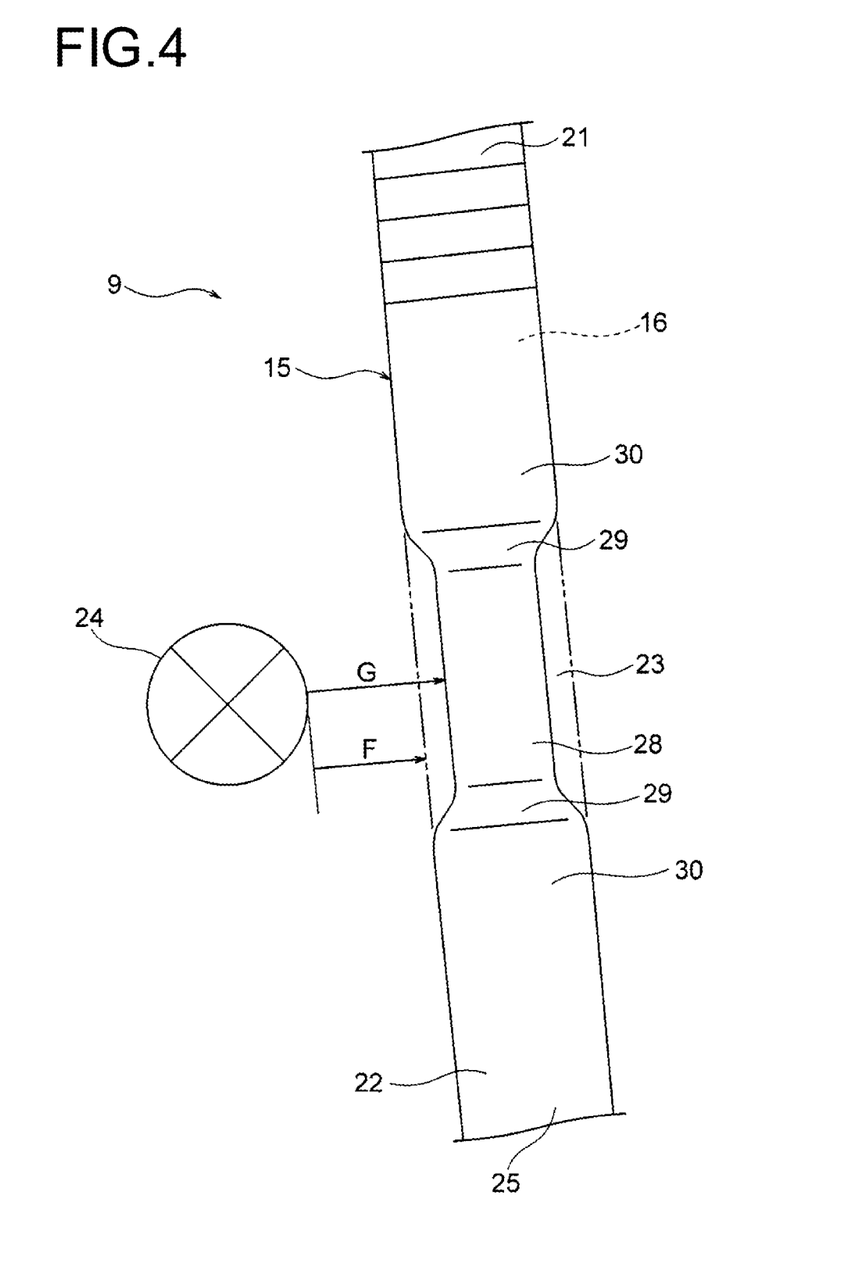
FIG. 4 is an enlarged view of the part of the arrow B of FIG. 2.
Figure 5:
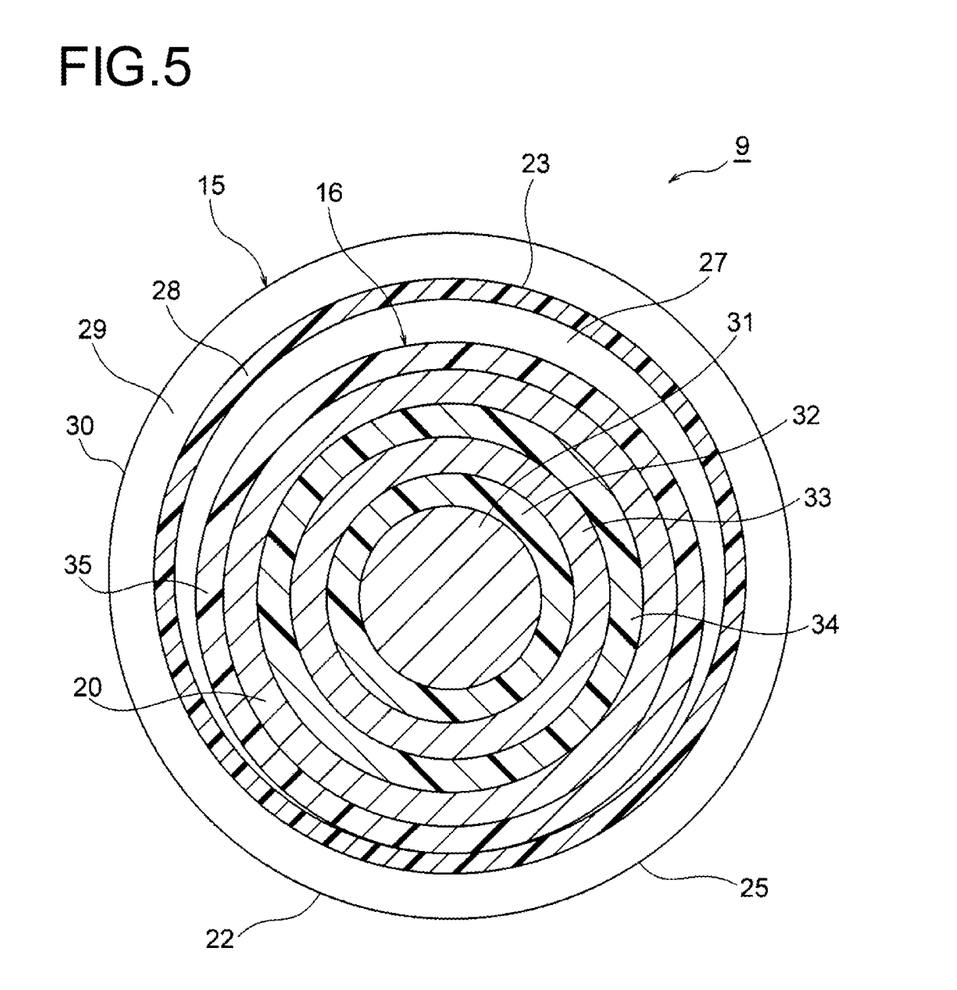
FIG. 5 is a cross-sectional view taken on line C-C illustrated in FIG. 2 and FIG. 3.

Hereinafter, a first embodiment will be described with reference to FIGS. 1 to 5. FIG. 1 is a schematic view showing a cabling condition of a wire harness according to the first embodiment. FIG. 2 is a structural view of the wire harness of FIG. 1, FIG. 3 is a longitudinal cross-sectional view of the part of the arrow A of FIG. 2, FIG. 4 is an enlarged view of the part of the arrow B of FIG. 2, and FIG. 5 is a cross-sectional view taken on line C-C of FIG. 2 and FIG. 3.

In the first embodiment, description will be given with an example where the present invention is adopted for wire harnesses cabled to a hybrid car (this may be an electric car or a general car).

In FIG. 1, reference designation 1 represents a hybrid car. The hybrid car 1 is a vehicle driven by a mixture of two powers of an engine 2 and a motor unit 3. The motor unit 3 is supplied with the power from a battery 5 (in other words, a battery pack) through an inverter unit 4. The engine 2, the motor unit 3 and the inverter unit 4 are, in the present embodiment, mounted in an engine room 6 in a position close to the front wheels and the like. Moreover, the battery 5 is mounted in a car rear portion 7 close to the rear wheels and the like. The battery 5 may be mounted in the car cabin that is present in the rear of the engine room 6.

The motor unit 3 and the inverter unit 4 are electrically connected by a high voltage wire harness 8. Moreover, the battery 5 and the inverter unit 4 are electrically connected by a high voltage wire harness 9. The wire harness 9 has its intermediate part 10 cabled to a body bottom surface 11. Moreover, the wire harness 9 is substantially parallelly cabled along the body bottom surface 11. The body bottom surface 11 is a known body and a so-called panel member, and a through hole (not shown) is formed in a predetermined position. Through this through hole, the wire harness 9 is inserted.

The wire harness 9 and the battery 5 are electrically connected through a junction block 12 provided on the battery 5. To the junction block 12, a rear end 13 of the wire harness 9 is electrically connected by a known method. The side of a front end 14 of the wire harness 9 is electrically connected to the inverter unit 4 by a known method.

The motor unit 3 includes a motor (not shown) and a generator (not shown) in its structure. Moreover, the inverter unit 4 has an inverter (not shown) and a converter (not shown). The motor unit 3 is formed as a motor assembly including a shielding case (not shown). Moreover, the inverter unit 4 is formed as an inverter assembly including a shielding case (not shown). The battery 5 which is an Ni-MH or Li-ion battery is modularized. For example, an electric storage device such as a capacitor may be used. The battery 5 is not specifically limited as long as it can be used for the hybrid car 1 and an electric car.

Hereinafter, the structure and composition of the wire harness 9 will be described. The wire harness 9 is provided as a high voltage member for electrically connecting the inverter unit 4 and the battery 5 as mentioned above.

In FIG. 2, the wire harness 9 includes an exterior member 15, at least one high voltage conducting path 16 (that is, the conducting path) protected by being covered with the exterior member 15, a shielding connector 19 provided on a wire harness terminal portion 18 including a terminal 17 of the high voltage conducting path 16, and an electromagnetic shielding member 20 (see FIG. 5). The electromagnetic shielding member 20 is included in the structure of the high voltage conducting path 16 in the first embodiment. This will be described later.

The exterior member 15 is a tubular member for accommodating and protecting the high voltage conducting path 16, has a bending tube portion 21, a non-bending tube portion 22 and a shape changed portion 23, and is resin-molded so that the overall shape thereof is substantially linear. While the exterior member 15 is made of a resin in the first embodiment, the present invention is not limited thereto and it may be made of a metal.

The bending tube portion 21 becomes a bent portion at the time of transportation of the wire harness 9 and at the time of path cabling, and the non-bending tube portion 22 continues with the bending tube portion 21. The non-bending tube portion 22 is provided as a non-bending (in other words, difficult-to-bend) portion. The bending tube portion 21 and the non-bending tube portion 22 are formed so as to be disposed in positions and lengths matching the configuration of attachment (in other words, the configuration of cabling) to the vehicle (that is, the target of attachment). The bending tube portion 21 and the non-bending tube portion 22 are formed so that the cross-sectional shapes thereof match each other. That is, they are formed so that when the bending tube portion 21 is circular in cross section, the non-bending tube portion 22 is also circular in cross section and when the bending tube portion 21 is substantially rectangular, the non-bending tube portion 22 is also substantially rectangular.

Regarding the bending tube portion 21 and the non-bending tube portion 22, although description will be given with an example where they are provided more than one in number in the first embodiment, the number is not specifically limited. That is, a structure may be adopted in which the number of bending portions 21 is one and on each side thereof, one non-bending tube portion 22 is continuously formed. Alternatively, a structure may be adopted in which the number of non-bending portions 22 is one and on each side thereof, one bending tube portion 21 is continuously formed.

The shape changed portion 23 is formed so as to be disposed in at least one position of the exterior member 15. In the first embodiment, it is formed so as to be disposed on the non-bending tube portion 22. As the non-bending tube portion 22, one where the shape changed portion 23 is present and one where the shape changed portion 23 is absent are present.

The shape changed portion 23 is formed more than one in number in order to enhance heat dissipation effect as described later. Moreover, the shape changed portion 23 is formed also to secure the distance from a heat generation source 24. Although one heat generation source 24 is illustrated in the first embodiment, the number is not limited thereto and may be more than one. The heat generation source 24 in FIG. 2 and FIG. 4 is, for example, the engine 2 (see FIG. 1) and an exhaust manifold (in addition thereto, the engine 2 and the motor unit 3 are cited as well).

The exterior member 15 will be described in a little more detail.

The bending tube portion 21 is formed in the configuration of an accordion tube having concave portions and convex portions extending in the circumferential direction so as to be continuous alternately. The bending tube portion 21 has its length set according to the bending range. The bending tube portion 21 has bendability (in other words, flexibility) and is formed at a part that can be bent. The bending tube portion 21 is formed at a part similar to a known corrugated tube in the first embodiment. The bending tube portion 21 is not limited to the above-mentioned accordion tube configuration as long as it is bendable.

Since the exterior member 15 has the part of a configuration similar to that of a corrugated tube as mentioned above, it can be regarded as a "corru-tube", a "partially formed corrugated tube" or the like.

The non-bending tube portion 22 has a non-bending tube portion body 25. This non-bending tube portion body 25 is formed as a portion that never bends at the time of transportation and at the time of path cabling as described above. The portion that never bends indicates a portion that is not positively provided with flexibility. The non-bending tube portion body 25 is formed so that the part not having the shape changed portion 23 is in the configuration of a straight tube that is circular in cross section. The cross section of the non-bending tube portion body 25 is not limited to circular and may be oval, elliptical, or substantially rectangular. Of the non-bending tube portion body 25, the part corresponding to the shape changed portion 23 is formed so as to have a circular cross section the same as the non-bending tube portion body 25. The cross section is not limited to circular and may be oval, elliptical, or substantially rectangular.

The non-bending tube portion body 25 is formed so as to be thin so that it has a minimum material thickness necessary to have a predetermined strength. On the non-bending tube portion body 25, a part enhancing rigidity, a part securing resistance to chipping and the like may be formed in addition to the shape changed portion 23.

The exterior member 15 is formed in a configuration where no slits are provided (in other words, there are no incisions) in the direction of the tube axis thereof. As a reason that no slits are provided, the securement of rigidity and strength is cited. Moreover, improving waterproofing property by preventing water intrusion is also cited. Further, preventing the high voltage conducting path 16 from being exposed, for example, from the bent part is also cited.

The exterior member 15 has, as the non-bending tube portion 22, a body bottom non-bending tube portion 26 cabled to the body bottom surface 11 (see FIG. 1). This body bottom non-bending tube portion 26 is formed so as to be long since it is cabled to the body bottom surface 11 (for example, since it is cabled along the reinforcement).

In FIG. 2 and FIG. 4, the shape changed portion 23 is formed as a portion where the size of the length of the outer periphery of the exterior member 15 is changed, or a portion that is large and small in diameter. Since formed as such a portion, the shape changed portion 23 has at least a small tube portion 28 having an accommodation space 27 necessary for accommodating the high voltage conducting path 16, tube continuous portions 29 one ends of which are continuous with the ends of the small tube portion 28, and large tube portions 30 continuous with the other ends of the tube continuous portions 29 and having a tubular shape that is larger in outer shape than the small tube portion 28.

The small tube portion 28 is formed so that the occupancy of the high voltage conducting path 16 is high. Specifically, it is formed so that the distance from the inner surface of the small tube portion 28 is shorter than the distance from that of the large tube portion 30 in a part that is not in contact with the high voltage conducting path 16.

The small tube portion 28, which is formed so that the occupancy of the high voltage conducting path 16 is high as described above, has the function as a portion that absorbs heat generated at the high voltage conducting path 16. Moreover, since it is a portion that absorbs heat, it also has the function of being capable of facilitating the dissipation of the absorbed heat through the outer surface. As is apparent from the shape of the small tube portion 28, in addition to the above-mentioned ones, it also has the function as a portion that suppresses the clattering of the high voltage conducting path 16.

The accommodation space 27 of the small tube portion 28 is formed in a size of an extent that does not obstruct the insertion of the high voltage conducting path 16 at the time of manufacture of the wire harness 9. When the high voltage conducting path 16 is inserted through such an accommodation space 27, the high voltage conducting path 16 comes into contact with the lower side of the small tube portion 28 by its own weight as shown in FIG. 3. And a slight clearance is formed above the high voltage conducting path 16 and on the non-illustrated right and left sides.

The large tube portion 30 is the non-bending tube portion body 25 itself, in other words, part of the non-bending tube portion body 25 corresponds to the large tube portion 30. Such a large tube portion 30 is, naturally, formed so as to have an outside diameter normally set as the exterior member 15 with respect to the diameter of the high voltage conducting path 16.

Assuming that the length in the direction of the arrow D is the outer periphery length of the large tube portion 30, the outer periphery length (that is, the length in the direction of the arrow D in FIG. 3) of the large tube portion 30 is longer than the outer periphery length (that is, the length in the direction of the arrow E in FIG. 3) of the small tube portion 28 (that is, the outer periphery length of the small tube portion 28 is shorter than the outer periphery length of the large tube portion 30). Therefore, in terms of the surface area, the large tube portion 30 is larger than the small tube portion 28.

The small tube portion 28 is not readily heat-affected since its surface area is small and since the distance from the heat generation source 24 (see FIG. 2) is not a distance F but a distance G as shown in FIG. 4.

As shown in FIG. 3, the formation range H of the small tube portion 28 is arranged as a portion that absorbs heat generated at the high voltage conducting path 16, and is set to a range sufficient for absorbing the heat. Moreover, it is also set to a range corresponding to the size of the heat generation source 24 (see FIG. 2). The formation range I of the tube continuous portion 29 is arbitrary. The longer the formation range I is, the gentler the slope of the tube continuous portion 29 is, and conversely, the shorter it is, the steeper the slope is. It is desirable that the formation range I be set in consideration of the work of insertion of the high voltage conducting path 16.

The shape changed portion 23 is resin-molded in such a manner as to narrow down the non-bending tube portion body 25 since the exterior member 15 is made of resin in the first embodiment. Alternatively, it is resin-molded in such a manner as to stretch out the non-bending tube portion body 25. These molding methods are examples. The small tube portion 28, the tube continuous portion 29 and the large tube portion 30 may be separately formed so that they are joined together later. Moreover, in the case where they are made of a metal, they may be formed by compression.

While the shape changed portion 23 may be formed by crushing in addition to the above methods, in this case, since the surface area is not reduced, the insusceptibility to the influence of heat is slightly inferior.

In FIG. 5, the high voltage conducting path 16 is at least one conducting path as described above, and in the first embodiment, a high voltage coaxial composite conducting path that is coaxial and formed of one cable is adopted (the structure of the conducting path is not limited thereto).

The high voltage conducting path 16 which is a high voltage coaxial composite conducting path has a positive circuit and a negative circuit in this one cable. That is, it has two systems of circuits. Specifically, it includes a first conducting path 31 that is circular in cross section and situated at the center of the high voltage conducting path 16, a first insulator 32 covering the outer periphery of the first conducting path 31 with a predetermined thickness, a second conducting path 33 provided outside the first insulator 32, a second insulator 34 covering the outer periphery of the second conducting path 33 with a predetermined thickness, the tubular electromagnetic shielding member 20 that is in close contact with the outer surface of the second insulator 34, and a sheath 35 covering the outer periphery of the electromagnetic shielding member 20 with a predetermined thickness. The setting of the sheath 35 is arbitrary, and the sheath 35 may be omitted.

The electromagnetic shielding member 20 is formed of a known braid, metal foil or the like, and the following arrangement may be adopted as well as the arrangement where the electromagnetic shielding member 20 is included in the structure of the high voltage conducting path 16 as described above. That is, an arrangement where the electromagnetic shielding member 20 is somewhat loose with respect to the second insulator 34 may be adopted.

The electromagnetic shielding member 20 may be formed in a tubular shape and disposed in close contact with the outer surface of the second insulator 34, or may be in the form of a tape or a sheet and wound around so as to be in close contact.

Regarding the conducting path (the high voltage conducting path 16), a known high voltage electric wire including a conductor and an insulator, a shielding electric wire, a cabtyre cable, a bus bar provided with an insulator and the like are cited in addition to the above-mentioned high voltage coaxial composite conducting path. The necessary number is at least one.

While the high voltage conducting path 16 which is a high voltage coaxial composite conducting path is of two systems in the first embodiment, the present invention is not limited thereto, and it may be of three systems . . . , a number, n, of systems. That is, the number of systems becomes n by coaxially increasing the number of circuits outward so as to form one cable.

From FIG. 5, it is apparent that the occupancy of the high voltage conducting path 16 in the small tube portion 28 is high. Moreover, it is also apparent that the area of contact with the high voltage conducting path 16 is sufficiently secured.

Returning to FIG. 2, to the wire harness 9, a non-illustrated retrofitted part is attached. As a retrofitted part, a clamp is cited for attaching and fixing the wire harness 9 to the target of fixing such as the body bottom surface 11 (see FIG. 1). Moreover, as retrofitted parts other than a clamp, a clip, a grommet, a protector and the like are cited.

The wire harness 9 is manufactured by inserting the high voltage conducting path 16 which is a high voltage coaxial composite conducting path through the exterior member 15 and then, attaching the above-mentioned non-illustrated retrofitted part to a predetermined position of the exterior member 15. Moreover, it is manufactured by providing each wire harness terminal portion 18 with the known shielding connector 19. One shielding connector 19 is an inverter side shielding connector, and the other shielding connector 19 is a battery side shielding connector.

As described above with reference to FIG. 1 to FIG. 5, the wire harness 9 has the shape changed portion 23 at least on a part of the exterior member 15, and the shape changed portion 23 includes the small tube portion 28, the tube continuous portions 29 and the large tube portions 30. For this reason, the occupancy of the high voltage conducting path 16 can be increased in the small tube portion 28. As a consequence, heat generated at the high voltage conducting path 16 is efficiently absorbed at the small tube portion 28, so that the absorbed heat can be dissipated from the small tube portion 28. Consequently, an advantage is produced in that the heat dissipation effect can be enhanced compared with the conventional one.

Moreover, according to the wire harness 9, since the exterior member 15 has the shape changed portion 23, the distance between the exterior member 15 and the heat generation source 24 can be secured by disposing the small tube portion 28 of the shape changed portion 23 in accordance with the heat generation source 24, so that an advantage is produced in that the susceptibility to heat from the outside can be reduced.

Second Embodiment

Figure 6:
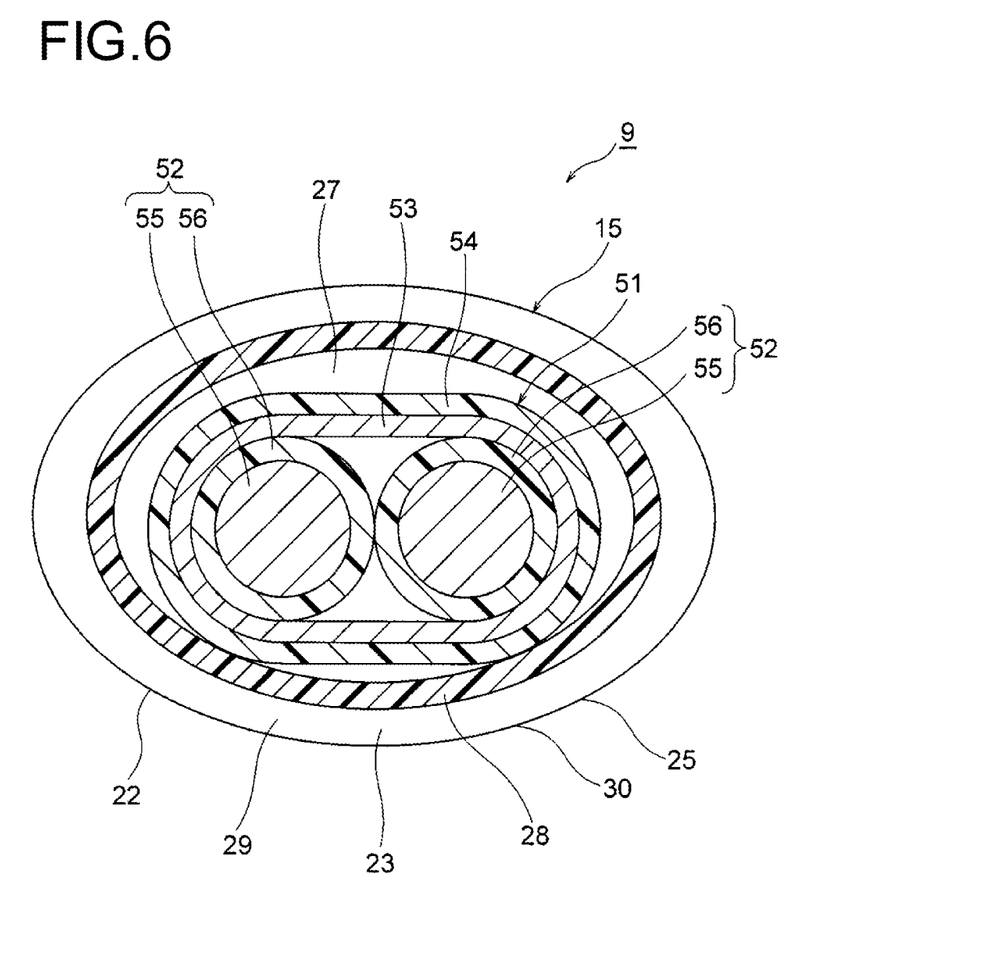
FIG. 6 is a cross-sectional view of a wire harness according to a second embodiment.

Hereinafter, a second embodiment will be described with reference to FIG. 6. FIG. 6 is a cross-sectional view of a wire harness according to the second embodiment. Elements basically the same as those of the above-described first embodiment are denoted by the same reference designations and detailed descriptions thereof are omitted. Moreover, the wire harness of the second embodiment is cabled for use similarly to the wire harness of the first embodiment.

In FIG. 6, the wire harness 9 includes an exterior member 15 that is oval in cross section and a high voltage conducting path 51 (that is, the conducting path) protected by being covered with the exterior member 15. A detailed description of the exterior member 15 of the second embodiment is omitted here since it is different from that of the first embodiment only in the cross-sectional shape (that is, the cross-sectional shape is formed in accordance with the high voltage conducting path 51).

The high voltage conducting path 51 is provided with two high voltage circuits 52, an electromagnetic shielding member 53 covering the two high voltage circuits 52, and a sheath 54 provided outside the electromagnetic shielding member 53.

The high voltage circuit 52 is a known high voltage electric wire in this embodiment, and has a conductor 55 and an insulator 56 covering the conductor 55. The high voltage circuit 52 is formed so as to have a length necessary for electrical connection. The high voltage circuit 52 is formed so as to be long since the wire harness 9 electrically connects the inverter unit 4 and the battery 5 (or the junction block 12) (see FIG. 1).

The conductor 55 is manufactured from copper, a copper alloy, aluminum, or an aluminum alloy. The conductor 55 may be either one having a conductor structure formed by twisting elemental wires or one having a rod-like conductor structure that is rectangular or round in cross section (For example, a conductor structure having a straight angle single core or a round single core, and in this case, the electric wire itself is also rod-like.). On the outer surface of the conductor 55 as described above, the insulator 56 made of an insulating resin material is formed by extrusion.

While the structure of a known high voltage electric wire is adopted as the high voltage circuit 52 in the second embodiment, the present invention is not limited thereto. That is, one where an insulator is provided to a known bus bar to form a high voltage circuit, or the like may be adopted.

The electromagnetic shielding member 53 is a member for electromagnetic shield (that is, a shielding member for taking measures against electromagnetic waves) that collectively covers the two high voltage circuits 52, and adopts a known braid formed by twisting a multiplicity of elemental wires.

The electromagnetic shielding member 53 is formed so as to have a length substantially the same as the entire length of the two high voltage circuits 52. The end portion of the electromagnetic shielding member 53 is electrically connected to the shielding case of the inverter unit 4 (see FIG. 1) or the like through a non-illustrated connection portion.

As the electromagnetic shielding member 53, for example, a metal foil having conductivity or a member including this metal foil may be adopted as long as it is capable of taking measures against electromagnetic waves.

The sheath 54 is formed by extruding a resin material having insulation performance with a predetermined thickness toward the outside of the electromagnetic shielding member 53, and is disposed in a position which is the outermost layer of the high voltage conducting path 51. The sheath 54 is terminal-processed so that the electromagnetic shielding member 53 is exposed with a predetermined length in manufacturing the wire harness 9.

As described above with reference to FIG. 6, the wire harness 9 of the second embodiment produces a similar advantage to that of the first embodiment. That is, since it is the wire harness 9 including the high voltage conducting path 51 and the exterior member 15 formed in accordance with the high voltage conducting path 51 is adopted, an advantage in that the heat dissipation effect can be enhanced at the shape changed portion 23 and an advantage in that the susceptibility to heat from the outside can be reduced.

Third Embodiment

Figure 7:
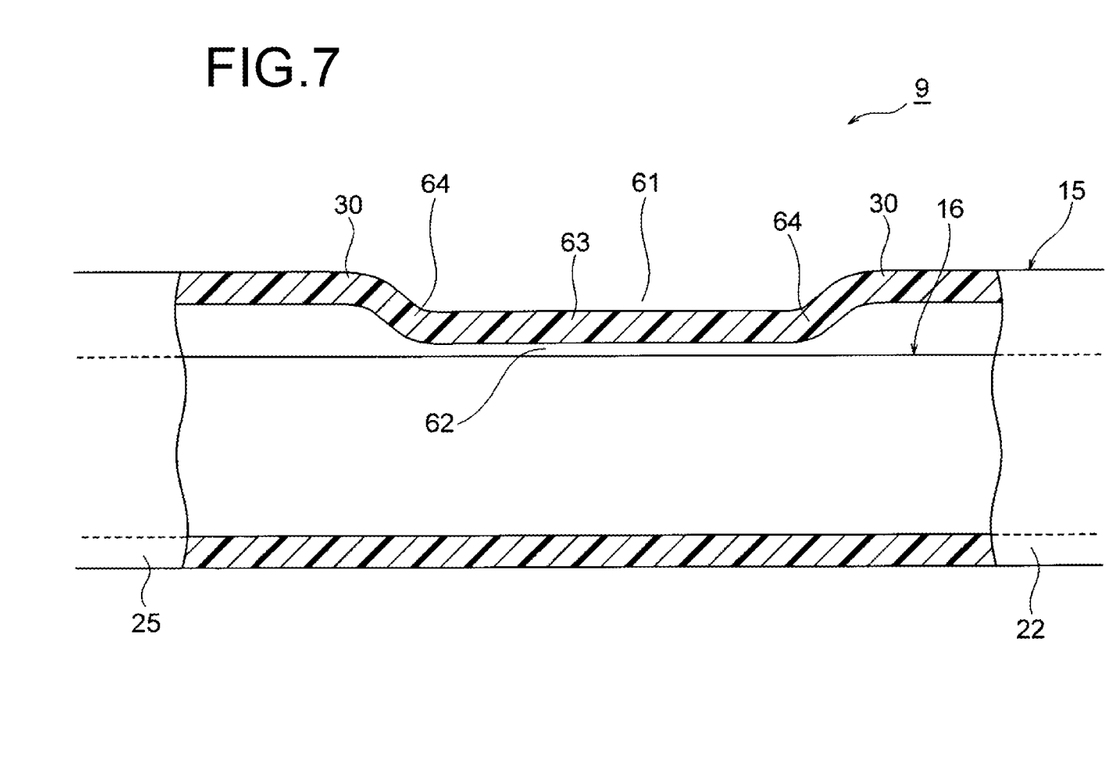
FIG. 7 is a cross-sectional view of an exterior member according to a third embodiment.

Hereinafter, a third embodiment will be described with reference to FIG. 7. FIG. 7 is a cross-sectional view of an exterior member as another example. Elements basically the same as those of the above-described first embodiment are denoted by the same reference designations and detailed descriptions thereof are omitted. Moreover, the wire harness of the third embodiment is cabled for use similarly to the wire harness of the first embodiment.

In FIG. 7, the wire harness 9 includes an exterior member 15 having a shape changed portion 61 in at least one position and a high voltage conducting path 16 (that is, the conducting path) protected by being covered with the exterior member 15.

The shape changed portion 61 is formed as a portion where the size of the length of the outer periphery of the exterior member 15 is changed, or a portion that is large and small in diameter. Since formed as such a portion, the shape changed portion 61 has at least one small tube portion 63 having an accommodation space 62 necessary for accommodating the high voltage conducting path 16, tube continuous portions 64 one ends of which are continuous with the ends of the small tube portion 63, and large tube portions 30 continuous with the other ends of the tube continuous portions 64 and having a tubular shape that is larger in outer shape than the small tube portion 63.

The small tube portion 63 is formed so as to have the same function as the small tube portion 28 of the first embodiment (see FIG. 3). In the third embodiment, it is formed in a shape that is partially concave in the circumferential direction. The large tube portion 30 corresponds to the non-bending tube portion body 25 itself at the non-bending tube portion 22 of the exterior member 15 as in the first embodiment.

As described above with reference to FIG. 7, the wire harness 9 of the third embodiment also produces a similar advantage to that of the first embodiment. That is, since it is the wire harness 9 having the shape changed portion 61 at the exterior member 15 and the shape changed portion 61 includes the small tube portion 63, the tube continuous portions 64 and the large tube portions 30, the occupancy of the high voltage conducting path 16 can be increased in the small tube portion 63. As a consequence, heat generated at the high voltage conducting path 16 is efficiently absorbed at the small tube portion 63, so that the absorbed heat can be dissipated from the small tube portion 63. Consequently, the heat dissipation effect can be enhanced compared with the conventional one.

Moreover, according to the wire harness 9 of the third embodiment, since the exterior member 15 has the shape changed portion 61, the distance between the exterior member 15 and the heat generation source 24 can be secured by disposing the small tube portion 63 of the shape changed portion 61 in accordance with the heat generation source 24 (see FIG. 2), so that the susceptibility to heat from the outside can be reduced.

Fourth Embodiment

Figure 8:
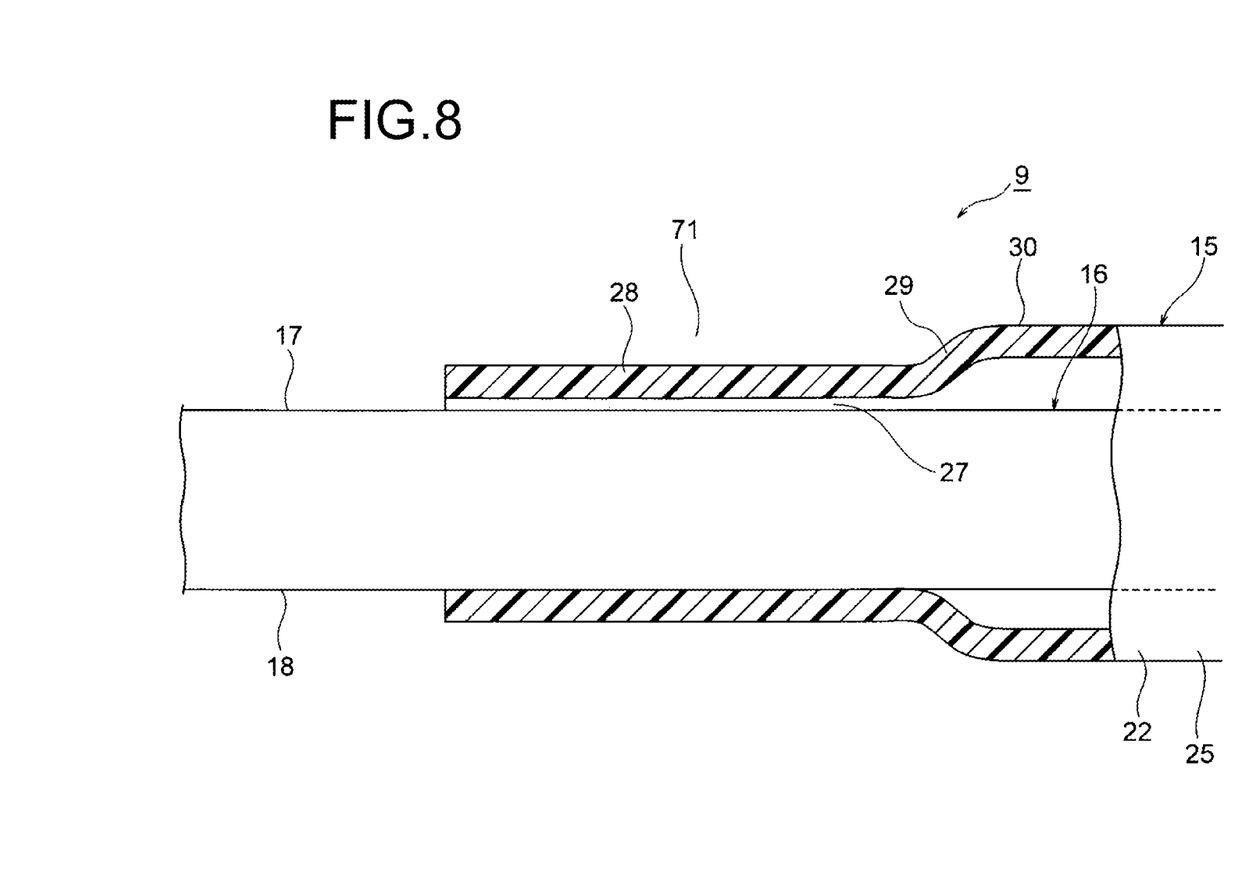
FIG. 8 is a cross-sectional view of an exterior member according to a fourth embodiment.

Hereinafter, a fourth embodiment will be described with reference to FIG. 8. FIG. 8 is a cross-sectional view of an exterior member as another example. Elements basically the same as those of the above-described first embodiment are denoted by the same reference designations and detailed descriptions thereof are omitted. Moreover, the wire harness of the fourth embodiment is cabled for use similarly to the wire harness of the first embodiment.

In FIG. 8, the wire harness 9 includes the exterior member 15 and the high voltage conducting path 16 (that is, the conducting path) protected by being covered with the exterior member 15. The exterior member 15 has a shape changed portion 71 at this terminal.

The shape changed portion 71 is formed as a portion where the size of the length of the outer periphery of the exterior member 15 is changed, or a portion that is large and small in diameter. Since formed as such a portion, the shape changed portion 71 has at least the small tube portion 28 having the accommodation space 27 necessary for accommodating the high voltage conducting path 16, the tube continuous portion 29 one end of which is continuous with the end of the small tube portion 28, and the large tube portion 30 continuous with the other end of the tube continuous portion 29 and having a tubular shape that is larger in outer shape than the small tube portion 28.

As described above with reference to FIG. 8, the fourth embodiment is an example where the shape changed portion 71 is disposed at the terminal of the exterior member 15. It is needless to say that the wire harness 9 of the fourth embodiment produces a similar advantage to that of the first embodiment. In addition thereto, by disposing the shape changed portion 71 at the terminal of the exterior member 15 as in the fourth embodiment, the clattering of the high voltage conducting path 16 can be suppressed by the small tube portion 28, and further, an advantage is produced in that the draw-out condition of the high voltage conducting path 16 can be stabilized.

Furthermore, it is to be noted that the present invention may be modified variously without changing the gist of the present invention.

Hereinafter, the wire harnesses according to the embodiments will be summarized.

(1) The wire harness 9 according to the embodiments includes at least one conducting path (the high voltage conducting path 16) and the tubular exterior member 15 covering the conducting path. The exterior member 15 has the shape changed portion 23 (61, 71) in at least one position. The shape changed portion 23 (61, 71) includes at least one small tube portion 28 (63) including the accommodation space 27 (62) necessary for accommodating the conducting path, the tube continuous portion 29 (64) one end of which is continuous with an end of the small tube portion 28 (63), and the large tube portion 30 being continuous with the other end of the tube continuous portion 29 (64) and including a tubular shape that is larger in outer shape than the small tube portion 28 (63).

(2) In the wire harness 9 according to the embodiments, in the shape changed portion 23 (61, 71), the outer periphery length of the small tube portion 28 (63) is shorter than the outer periphery length of the large tube portion 30.

(3) In the wire harness 9 according to the embodiments, the exterior member 15 is made of a resin.

(4) In the wire harness 9 according to the embodiments, the exterior member 15 is made of a metal.

The wire harness according to the present invention is useful in that a wire harness can be provided that is capable of enhancing heat dissipation effect and capable of reducing the susceptibility to heat from the outside.

What is claimed is:

1. A wire harness comprising: at least one conducting path; and an exterior member that covers the conducting path, said exterior member is a tubular portion, wherein the the tubular portion has a shape changed portion in at least one position; wherein the shape changed portion includes: at least one small tube portion which includes an accommodation space necessary for accommodating the at least one conducting path; a tube continuous portion one end of which is continuous with an end of the at least one small tube portion; and a large tube portion which is continuous with another end of the tube continuous portion and includes a tubular shape that is larger in outer shape than the small tube portion; wherein the at least one small tube portion is formed at a range sufficient for absorbing and dissipating heat generated at the at least one conducting path; wherein a peripheral wall of the small tube portion is partially concave in a circumferential direction of the small tube portion so that a first distance from a center line of the large tube portion to a first part of the peripheral wall of the small tube portion is different from a second distance from the center line to a second part of the peripheral wall of the small tube portion, the first part being opposed to the second part.

2. The wire harness according to claim 1, wherein in the shape changed portion, an outer periphery length of the small tube portion is shorter than an outer periphery length of the large tube portion.

3. The wire harness according to claim 1, wherein the exterior member is made of a resin.

4. The wire harness according to claim 1, wherein the exterior member is made of a metal.

5. The wire harness according to claim 1, wherein the at least one small tube portion is formed at a position in a neighborhood of a heat generation source when the wire harness is cabled.

6. The wire harness according to claim 5, wherein the at least one small tube portion of a plurality of small tube portions is formed at the range which is set in accordance with a size of the heat generation source.

7. The wire harness according to claim 1, wherein the center line extends collinear with a longitudinal axis of the large tube portion, and wherein, in a cross-sectional view of the small tube portion such that the centerline extends in a horizontal direction, a top part of the peripheral wall of the small tube portion concaves toward the centerline, whereas a bottom part of the peripheral wall of the small tube portion is not concaved toward the centerline.

* * * * *